United States Patent
Wen

[11] Patent Number: 5,222,916
[45] Date of Patent: Jun. 29, 1993

[54] ECCENTRICALLY OPERATED SPEED-VARIATING MEANS WITH BROADENED SPEED VARIATION

[76] Inventor: Maz Wen, P.O. Box 4-42, Sanchung, Taipei Hsien, Taiwan, (241)

[21] Appl. No.: 926,932

[22] Filed: Aug. 10, 1992

[51] Int. Cl.⁵ .............................................. F16H 55/30
[52] U.S. Cl. ...................................... 474/69; 474/72
[58] Field of Search .................................. 474/69–72; 280/236, 237, 238

[56] References Cited

U.S. PATENT DOCUMENTS

| | | | |
|---|---|---|---|
| 2,958,239 | 11/1960 | Bernier | 474/72 |
| 4,299,581 | 11/1981 | Korosue | 474/69 |
| 5,127,883 | 7/1992 | Wen | 474/72 |

*Primary Examiner*—Thuy M. Bui

[57] ABSTRACT

A speed-variating means especially for a bike includes an eccentric wheel rotatably driven by a dringing wheel such as a chain wheel of a bike, the eccentric wheel having its first side portion coupled with a rotating disk rotatably mounted on an axle and connected with a hub and an output wheel such as a bike rear wheel and having a second side portion of the eccentric wheel rotatably held in a stationary disk secured to a retaining bowl fixed on the axle of the output wheel, and a variable speed adjusting device operatively moving the eccentric wheel to cling a center of the eccentric wheel with an axis of the axle, or eccentrically moving the eccentric wheel to and from the axis, so that a broader speed variation ratio can be effected by comparing a smaller eccentric radius of the eccentric wheel (wheel center) about the axle axis with a larger eccentric radius of the eccentric wheel about the axle axis.

12 Claims, 5 Drawing Sheets

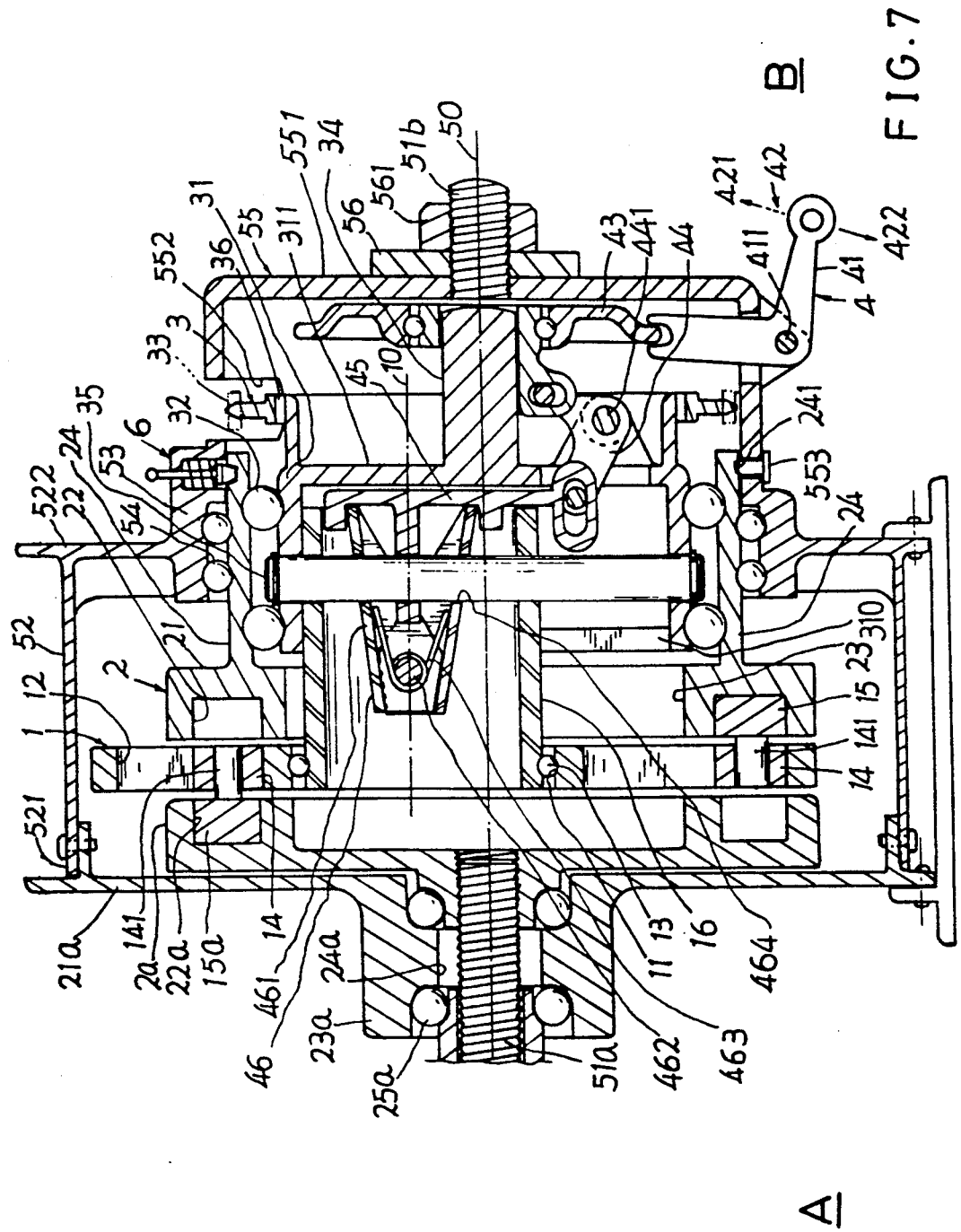

ECCENTRICALLY OPERATED SPEED-VARIATING MEANS WITH BROADENED SPEED VARIATION

BACKGROUND OF THE INVENTION

U.S. Pat. No. 5,127,883 entitled "Homogeneous Speed-variating Means as Eccentrically Operated-38 also granted to the same applicant of this application discloses a central eccentric wheel carrying two disks, disposed on two opposite sides of the central eccentric wheel, eccentrically rotating about an axle of a bike wheel so that a homogeneous wide speed variation can be effected by a first variation from the first disk to the central eccentric wheel and a second speed variation from the central eccentric wheel to the second disk. However, in adjusting the central eccentric wheel (1) by moving an adjusting pipe (42) of the variable speed adjusting means (4) of the U.S. Pat. No. 5,127,883, the adjusting pipe (42) will be obstructed or retarded by the guiding disk (31) of the chain wheel (3) including the central ring (311) of the guiding disk (31) and the axle, being impossible to adjust a center of the eccentric wheel to align or approximate the axle axis, so that a radial movement of the eccentric shell (1) about the axle (51) is still limited to thereby influence its speed-variation effect.

SUMMARY OF THE INVENTION

The object of the present invention is to provide a speed-variating means especially for a bike including an eccentric wheel rotatably driven by a driven wheel such as a chain wheel of a bike, the eccentric wheel having its first side portion coupled with a rotating disk rotatably mounted on an axle and connected with a hub and an output wheel such as a bike rear wheel and having a second side portion of the eccentric wheel rotatably held in a stationary disk secured to a retaining bowl fixed on the axle of the output wheel, and a variable speed adjusting device operatively moving the eccentric wheel to align a center of the eccentric wheel with an axis of the axle, or eccentrically moving the eccentric wheel to and from the axis, so that a broader speed variation ration can be effected by comparing a smaller eccentric radius of the eccentric wheel (wheel center) about the axle axis with a larger eccentric radius of the eccentric wheel about the axle axis.

BRIEF DESCRIPTION OF THE DRAWINGS

FIG. 7 shows an encased speed variating means of the present invention.

DETAILED DESCRIPTION

Figure 1:
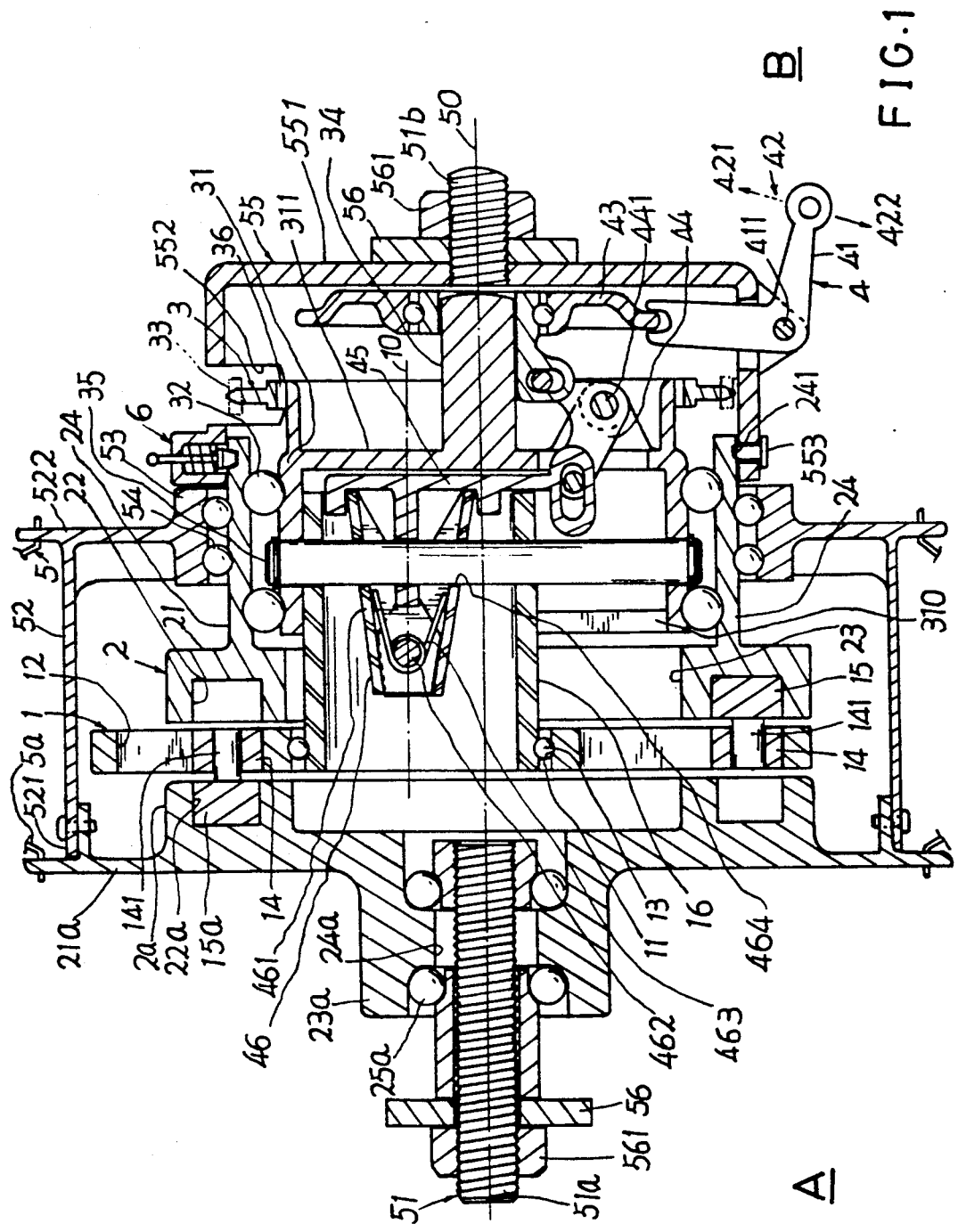
FIG. 1 is an illustration of the present invention.
Figure 2:
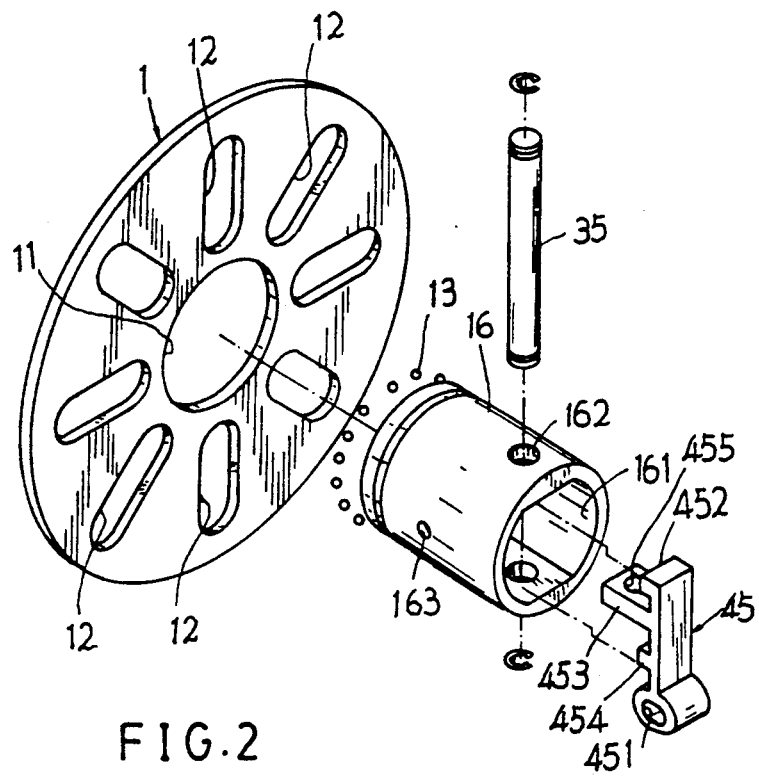
FIG. 2 is a partial perspective view of several elements of the present invention.

As shown in FIGS. 1-6, the present invention comprises: an eccentric wheel 1, a stationary disk 2, a rotating disk 2a, a driving wheel 3, a variable speed adjusting means 4, a hub means 5, and a safety tripping means 6.

Eccentric wheel 1 sandwiched between the stationary disk 2 and the rotating disk 2a includes: a central hole 11 defining an eccentric-wheel center 10, a plurality of radial slots 12 radially formed in the eccentric wheel 1 about the eccentric-wheel center 10 each slot 12 reciprocatively engageable with a roller 14 which is rotatably secured with a sliding block 15 or 15a, and a central rotating sleeve 16 rotatably coupled with the central hole 11 by bearings 13.

Figure 3:
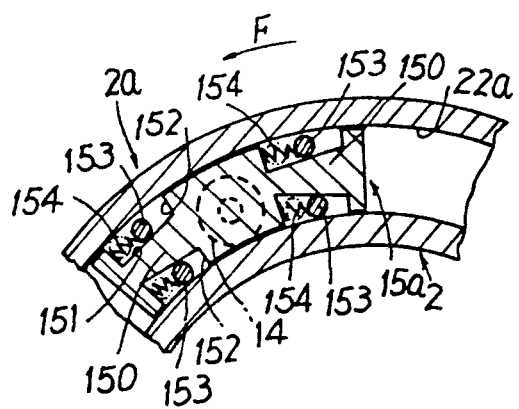
FIG. 3 shows a sliding block used in the present invention.
Figure 4:
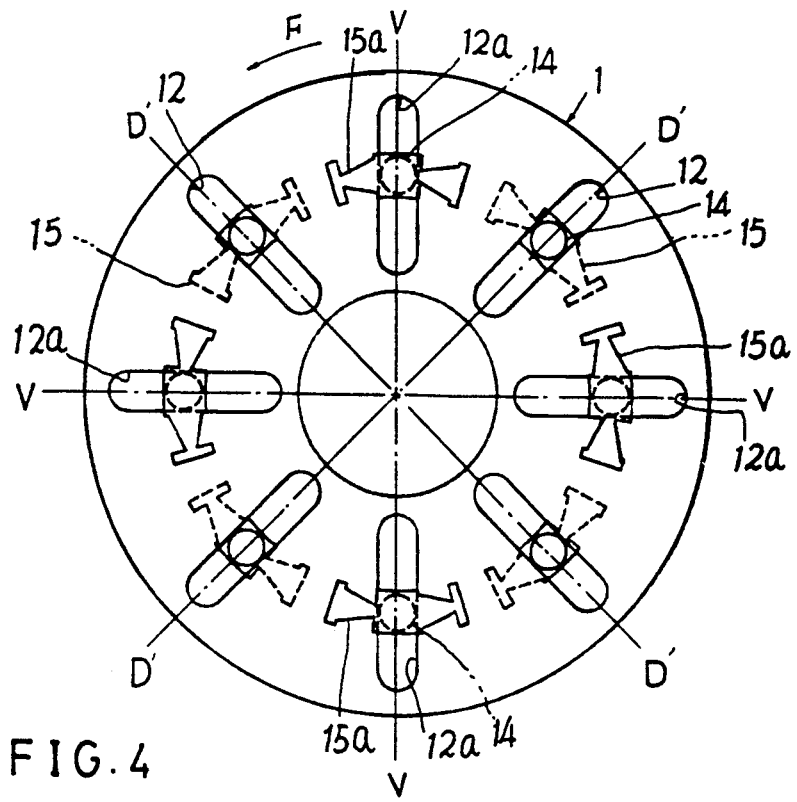
FIG. 4 shows an eccentric wheel of the present invention.

Each roller 14 has a spindle 141 for respectively pivotally securing a pair of sliding block 15a, 15 on a first or left side (A) and a second or right side (B) o the roller 14 as shown in FIG. 1. For instance, the left side sliding block 15a is slidably mounted in the annular groove 22a formed in the rotating disk 2a. The detailed structure of the sliding block 15a is shown in FIG. 3 which is similar to the sliding block 15, 15a as disclosed in U.S. Pat. No. 5,127,883. For explanation purpose, the sliding block 15a is still described herewith and includes a pair of wedge portions 150 each tapered counter-clockwise (FIG. 3) and disposed on a rear and a front side of the block 15, and two pairs of clutching balls 153 operatively moving on the two wedge portions 150.

Each wedge portion 150 is tapered counter-clockwise (if the wheel 1 and disk 2a are coated counter-clockwise F) to form a pair of acute-angle portions 151 at its tapered side and a pair of obtuse-angle portions 152 at an opposite side to the tapered side. A ball 153 is retained on each acute-angle portion 151 by a tension spring 1545. Such a tension spring 154 normally urges the ball 153 on the tapered wedge portion 150 towards the obtuse-angle portion 152 to frictionally couple the wedge portion 150 of the block 15a with an annular groove wall of the disk 2a so that upon a counter-clockwise rotation of the wheel 1 as driven by the driving wheel 3 rotating counter-clockwise F, the sliding block 14 as coupled with the disk 2a and the roller 14 engaged with the wheel 1 will couple the rotation of the central eccentric wheel 1 with sides 2a. The sliding block 15 held in the stationary disk 2 is similar to the sliding block 15a and its explanation is thereby omitted.

As shown in FIG. 3, four slots 12 are diagonally arranged on the wheel 1 (D'—D' line on FIG. 3). engageable with four rollers 14 for connecting four sliding blocks 15 on a right side of the wheel 1 engageable with the stationary disk 2, whereas the other for slots 12a are crossings coordinately arranged on the wheel 1 (V—V line) for connecting other four sliding blocks 15a on a left side of the wheel 1 engageable with the rotating disk 2a. Therefore, the eccentric wheel 1 may drive the rotating disk 2a, while the wheel 1 is rotably mounted on the stationary disk 2.

The stationary disk 2 positioned on a right side of the eccentric wheel 1 and mounted an axle 51 of an output wheel 5a includes: a peripheral flange 21 formed on another peripheral portion o the stationary disk 2 having an annular groove 22 angularly formed bin the peripheral flange 21 for slidably engaging a plurality of right sliding blocks 15 in the annular groove 22 for rotatably mounting the eccentric wheel 1 on the stationary disk 2, a central bore 23 hollowly formed in the stationary disk 2 within the peripheral flange 21 allowing an eccentric movement of the central rotating sleeve 16 of the eccentric wheel 1 within the bore 23 of the stationary disk 2, and a cylindrical bush 24 protruding laterally for rotatably engaging the driving wheel 3.

The rotating disk 2a positioned on a left side of the eccentric wheel 1 includes; an outer flange 21a secured with a hub 52 of the hub means 5, an annular groove 22a annularly formed in the outer flange 21a facing the eccentric wheel 1 for slidably engaging a plurality of left sliding blocks 15 in the annular groove 22a, an axle bush 23a protruding axially from a central portion of the rotating disk 2a having a bush hole 24a formed in the axle bush 23a for rotatably engaging the axle 51 by bearings 25a. The rotating disk 2a is rotatably wheel in first side A of the hub means 5 or output wheel 5a secured with the hub means 5 which may be a bike rear wheel.

The driving wheel 3 includes: a rotating bowl portion 31 generally cylindrical shaped and rotatably mounted in the cylindrical bush 24 of the stationary disk 2 with bearings 32, a chain 33 coupling the driving wheel 3 and a sprocket (not shown) attached with a pair of pedals of a bike for rotating the wheel 3, a spindle 34 protruding laterally towards a second side B of the hub means 5 opposite o the first side A to be aligned with an axle axis 50 of the axle 51, and a guiding rod 35 diametrically secured in the bowl portion 31 slidably engageable with a pair of rod holes 162 diametrically formed in the central rotating sleeve 16 of the eccentric wheel 1. Int h bowl portion 31, there may ge provided with two parallel guiding block portions 311 slidably disposed on two sides of the rotating sleeve 16 for stably adjusting the sleeve 16 in the block portions in the bowl portion 31.

The variable speed adjusting means 4 includes: as first rocker lever 41 having a first rocker pivot 411 secured on a retaining bowl 5 for pivotally mounting the first rocker lever 41 on the retaining bowl 55, an actuating wire 42 secured on a wire connector 412 formed on an outer end of the first rocker lever 41 for biasing the first lever 41, a sliding disk 43 having a sliding sleeve 431 reciprocatively slidably mounted on the spindle 34 of the driving wheel 3 and a circular disk member 433 rotatably coupled with the siding sleeve 31 by bearing 432 and rotatably engageable with a annular recess 413 annularly formed in an inner end of the firs lever 41, a second rocker lever 44 having a second rocker pivot 441 secured n the bowl portion 31 of the driving wheel 3 for pivotally securing the second lever 44 on the driving wheel 3 and having an outer pin 442 coupled with an acquaint loop portion 434 formed on an inner end of the sliding sleeve 431 of the sliding disk 43, a pusher member 45 having a base loop portion 451 engaging an inner pin 443 formed on an inner end of the second lever 44 poking into the bowl portion 31 of the driving wheel 3 through a lever hole 312 formed in a bottom disk portion 311 of the bowl portion 31 of the driving wheel 3, and having a first extension 452, a central extension 453 and a second extension 454 juxtapostionally formed on the pusher member 45 with a central extension hole 455 formed in the central extension 453 slidably engageable with the guiding rod 35 secured on the bowl portion 31 of the driving wheel 3, and a caliper retainer 46 normally held on the guiding rod 35 and adjustably moved on eh guiding rod 35 as actuated by the pusher member 45.

The caliper retainer 46 includes: a pair of caliper arms 461 pivotally secured in the central rotating sleeve 16 of the eccentric wheel 1 by a caliper pivot 462 aligned with the eccentric-wheel center 10 and fixed in two pivot holes 163 diametrically formed in the rotating sleeve 161 with the calliper pivot 462 projectively perpendicular to the guiding rod 35, each calliper arm formed a rod hole 464 for passing the guiding rod 35, and a restoring spring 463 normally urging the two calliper arms 461 extendibly to lock each arm 461 on the guiding rod 35 by dogging each rod hole 464 on each arm 461 with the guiding rod 35, and operatively compressed to contract the two arms 461 by the extensions 452, 453, 454 of the pusher member 45 for slidably positioning the calliper retainer 46 and the rotating sleeve 126 secured with the retainer 46 on the guiding rod 35 for eccentrically operating the rotating sleeve 16 and the eccentric wheel 1 about the axile axis 50 for speed variation.

Figure 5:
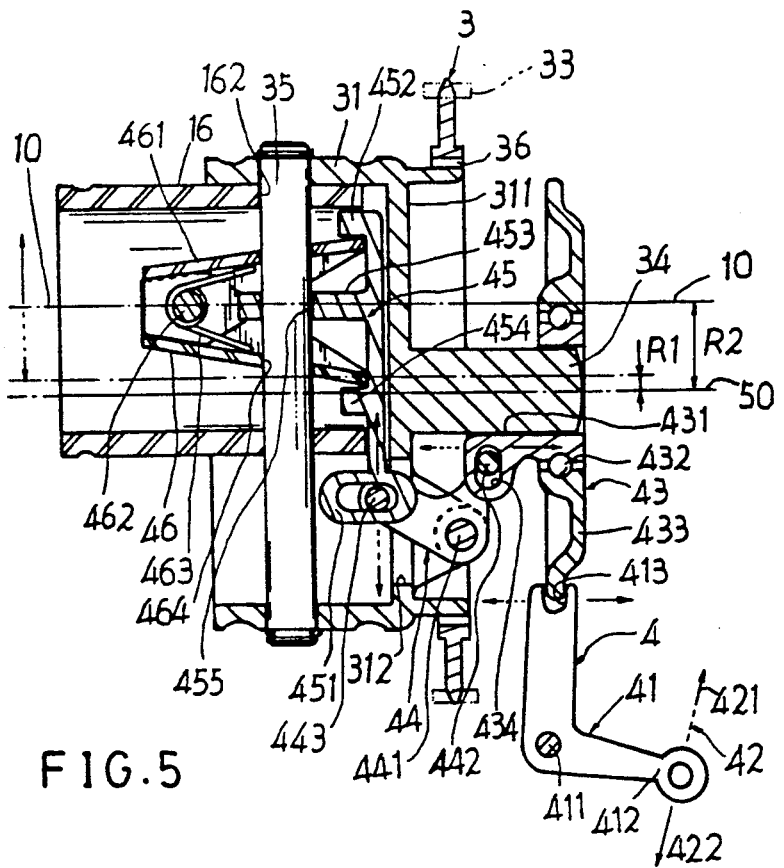
FIG. 5 shows an operating principle of a variable speed adjusting means of the present invention.
Figure 6:
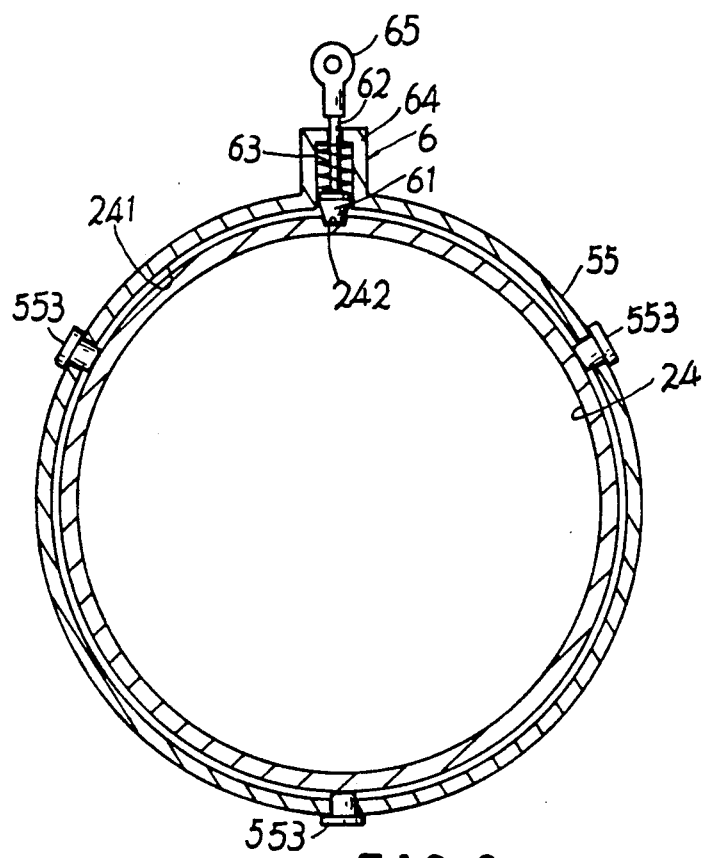
FIG. 6 shows a safety tripping means of the present invention.

The pusher member 45 includes the first extension 452 operatively urging a first peripheral potion of the rotating sleeve 16 radially, the central extension 453 and the first extension 452 commonly confining a first calliper arm 461 therebetween, and the second extension 454 operatively urging a second peripheral portion of the rotating sleeve 16 radially composite to the first extension 452 and commonly confining a second calliper arm 461a opposite to the first calliper arm 461, the central extension 453 positioned in between the first and second extensions 452, 454, whereby when operatively moving the extensions of the pusher member 45 to push the rotating sleeve 16 radially outwardly from the axle axis 50, an eccentric radius R2 as shown in FIG. 5 will be increased to accelerate a rotation speed of the output wheel 5a; and upon a radially inwardly moving of the extensions of the pusher member 45 and the rotating sleeve 16 towards the axis 50, an eccentric radius R1 will be decreased for deceasing a rotation speed of the wheel 5a.

The hub means 5 includes: a hub 52 having a first hub portion 521 secured with the rotating disk 2a rotatably mounted on a first axle portion 51a of the axle 51 which is secured on a frame 56 such as a bottom fork of a bike by a nut 561, and a frame 56 such as a bottom fork of a bike by a nut 561, and a second hub portion 522 opposite to the first hub portion 521 secured with the collar 53 rotatably engaging the cylindrical bush 24 of the stationary disk 2 by bearing 54, the cylindrical bush 24 secured on a retaining bowl 55 generally cylindrical shaped and having a round plate 551 secured on a second axle portion 51b opposite to the first axle portion 51a with the second axle portion 51b secured on the frame by nut 561 as shown in FIG. 1.

The retaining bowl 55 has a chain slot 552 cut in the bowl 55 for passing a driving chain 33 of the driving wheel 3.

The safety tripping means 6 includes: a taper plug 61 tapered downwardly and secured with a stem 62 to be slidably held in a plug cylinder 64 fixed on the retaining bowl 55, and a tensioning spring 63 held in the cylinder 64 to normally urge the taper plug 61 downwardly to normally engage a plug hole 242 diverging upwardly and formed in the cylindrical bush 24 of the stationary disk 2 for stationarily locking the cylindrical bush 24 and the stationary disk 2 with the retaining bowl 55 and a axle frame 56, whereby upon acting an overload driving force on the eccentric wheel 1, the rotating disk 2a, and the stationary disk 2, the taper plug 62 will be thrusted upwardly by the plug hole 242 of the cylindrical bush 24 to uncouple the stationary disk 2 from the retaining bowl 55 for preventing any over-stress damage to the present invention. The stem 62 is connected with a handle 65 or manually uncoupling the taper plug from the bush 24.

The tapering angle of the taper lug 61 and the elastic force of the tensioning spring 63 is designed for normally frictionally and resiliently engaging the taper plug with the cylindrical bush 24, depending upon a pre-set safe working load of the driving force on the speed-variating system of the invention.

A plurality of coupling plugs 553 are provided for rotatably coupling the bush 24 with the retaining bowl 55 each plug 553 is engageable with the plug groove 241 annularly recessed in an outer periphery of the bush 24.

In operating the present invention for speed variation, the bowl portion 31 as rotatably driven by the driving wheel 3 will rotate the rotating sleeve 16 to eccentrically rotate the eccentric wheel about the axle axis 50 for rotating the rotating disk 2a, thereby rotating the hub 52 and the output wheel 5a such as a bike rear wheel. As shown in FIG. 5, the sleeve 16 and the eccentric wheel 1 may be inwardly moved to allow the eccentric-wheel center 10 to approximate the axle axis 50 to have a smaller eccentric radius R1 for a slower rotation speed of the output wheel 5a, while the sleeve 16 and wheel 1 may also be moved radially outwardly to separate the wheel center 10 from the axle axis 50 to obtained a larger eccentric radius R2 for a quicker running speed of the hub and wheel 5a.

If the R1 is very close tho the axle radius, the R1 will approximate zero, sot hat a speed variation ratio between R2 and R1 will be very large as shown as follows:

$$\frac{R_2}{R_1 \to 0} \approx \infty$$

Therefore, the present invention provides s speed variating mechanism having a free eccentric operation without being retarded by the axle for obtaining a greater speed variation ratio, boarder than that of any conventional speed variating system.

In adjusting the speed variating means for the invention, the adjusting wire 42 of being pulled in a forward direction 421 as shown in FIG. 5, the firs rocker lever 41 is pivoted to push the sliding disk 43 inwardly (as shown in dotted line) to bias the second rocker lever 44 to pull the pusher member 45 inwardly so that the extension 452 of the pusher member 45 will compress the calliper arm 461 to unlock the calliper retainer 46 from the guiding rod 35 and the sleeve 16 will be radially inwardly moved to decrease the eccentric radius (between wheel center 10 and the axle axis 50) for decreasing a running speed of the output wheel 5a.

Or, the wire 42 is pulled in a rearward direction 422 to move the sliding disk 43 outwardly in solid line direction as shown in FIG. 5 to move the pusher member 45 radially outwardly to increase the eccentric radius for accelerating the running speed.

The speed-variating mechanism of the invention may be encased in a housing (not shown), and an output rotating mechanism can be directly connected to the left axle portion 51a for use in other speed-variating systems, not only for bike use, as shown in FIG. 7.

I claim:
1. A speed-variating means comprising:
an eccentric wheel rotating driven by a driving wheel, the eccentric wheel having is firs side portion coupled with a rotating disk rotatably mounted on a first axle portion of an axle and connected with a hub means and an output wheel and having a second side portion of the eccentric wheel rotatably held in a stationary disk secured to a retaining bowl fixed on a second axle portion of the axle, and a variable speed adjusting means operatively moving the eccentric wheel to align a center of the eccentric wheel with an axis of the axle, or eccentrically moving the eccentric wheel to and from the axis, so that a broader speed variation ratio will be effected by comparing a smaller eccentric radius of the eccentric wheel about the axle axis with a larger eccentric radius of the eccentric wheel about the axle axis.

2. A speed-variating means according to claim 1, wherein said eccentric wheel sandwiched between the stationary disk and the rotating disk includes: a central hole defining an eccentric-wheel center, a plurality of radial slots radially formed in the eccentric wheel about the eccentric-wheel center each slot reciprocatively engageable with a roller which is rotatably secured with a sliding block, and a central rotating sleeve rotatably coupled with the central hole.

3. A speed-variating means according to claim 1, wherein said stationary disk positioned on a light side of the eccentric wheel and mounted on an axle of the output wheel includes: a peripheral flange formed on an outer peripheral portion of the stationary disk having a leftwardly-oriented annular groove annularly formed in the peripheral flange for slidably engaging.a plurality of right sliding blocks in the annular groove for rotatably mounting the eccentric wheel on the stationary disk, a central bore hollowly formed in the stationary disk within the peripheral flange allowing an eccentric movement f the central rotating sleeve of the eccentric wheel within the bore of the stationary disk, and a cylindrical bush protruding laterally for rotatably engaging the driving wheel.

4. A speed-variating means according to claim 1, wherein said rotating disk positioned on a left side of the eccentric wheel includes: an outer flange secured with a hub of the hub means, a rightwardly-oriented annular groove annularly formed in the our flange facing the eccentric wheel for slidably engaging a plurality of left sliding blocks it the rightwardly-oriented annular groove, an axle bush protruding axially from a central portion of the rotating disk having a bush hole formed in the axle bush for rotatably engaging the axle, said rotating sides rotatably held on the axle at a first side of the hub means.

5. A speed-variating means according to claim 3, wherein said driving wheel includes: a rotating bowl portion generally cylindrical shaped and rotatably mounted in the cylindrical bush of the stationary disk, a chain coupling the driving wheel for driving the driving wheel, a spindle protruding laterally towards a second side of thee hub means opposite to the first side to be aligned with the axle axis of the axle, and a guiding rod diametrically secured in the bowl portion slidably engageable with a pair of rod holes diametrically formed in the central rotating sleeve of the eccentric wheel.

6. A speed-variating means according to claim 5, wherein said variable speed adjusting means includes: a first rocker lever having a first rocker pivot secured on a retaining bowl secured on the axle for pivotally mounting the first rocker lever on the retaining bowl, an actuating wire secured on a wire connector formed on an outer end of the firs rocker lever for biasing the first lever, a sliding disk having a sliding sleeve reciprocatively slidably mounted on the spindle of the driving wheel and a circular disk member rotatably coupled with the sliding sleeve and rotatably engageable with an annular recess annularly formed in an inner end of the first lever, a second rocker lever having a second rocker pivot secured on the bowl portion of the driving wheel for pivotally securing the second lever on the driving wheel and having an outer pin coupled with an actuating loop portion formed on an inner end of the sliding sleeve of the sliding disk, a pusher member having a base loop portion engaging an inner pin formed on an inner end of the second lever poking into the bowl portion of the driving wheel through a leer hole formed din a bottom disk portion of the bowl portion of the driving wheel, and having a first extension, a central extension and a second extension juxtapostionally formed on the pusher member with a central extension hole formed in the central extension slidably engagable with the guiding rod secured on the bowl portion of the driving wheel, and a calliper retainer normally held on the guiding rod and adjustably moved on the guiding rod as actuated by the pusher member.

7. A speed-variating means according to claim 6, wherein said calliper retainer includes: a pair of calliper arms pivotally secured in the central rotating sleeve of the eccentric wheel by a caliper pivot aligned with the eccentric-wheel center and fixed in two pivot holes diametrically formed in the rotating sleeve with the calliper pivot projectively perpendicular rope the guiding rod, each calliper arm formed a rod hole for passing the guiding rod, and a restoring spring normally during the two caliper arms extendibly to lock each arm on the guiding rod by dogging each rod hole on each arm wit the guiding rod, and operatively compressed to contract the two arms by the extensions of the pusher member for slidably positioning the calliper retainer and the rotating sleeve secured with the calliper retainer on the guiding rod for eccentrically operating the rotating sleeve and the eccentric wheel about the axle axis for speed variation.

8. A speed-variation means according to claim 7, wherein said pusher member includes the first extension operatively urging a first peripheral portion of the rotating sleeve radially, the central extension and the first extension commonly confining a first calliper arm therebetween, and the second extension operatively urging a second peripheral portion of the rotating sleeve radially opposite to the first extension and commonly confining a second calliper arm opposite to the first calliper arm, the central extension positioned in between the first and second extensions, whereby when operatively moving the extensions of the pusher member to push the rotating sleeve radially outwardly from the axle axis, an eccentric radius will be increased to accelerate a rotation speed of the output wheel; and upon a radially inwardly moving of the extensions of the pusher member and the rotating sleeve towards the axis, an eccentric radius will e decreased for decreasing a rotation speed of the output wheel.

9. A speed-variating mans according to claim 1, wherein said hub means includes: a hub having a first hub portion secured with the rotating disk rotatably mounted on a first axle portion of the axle which is secured on a frame of the output wheel, and a second hub portion opposite to the first hub portion secured with a collar rotatably engaging a cylindrical bush of the stationary disk, the cylindrical bush secured on a retaining bowl generally cylindrical shaped secured on a second axle portion opposite of the first axle portion with the second axle portion secured on the frame.

10. A speed-variating means according to claim 1, wherein a safety tripping means is provided, which includes: a taper plug tapered downwardly and secured with a stem to be slidably held in a plug cylinder fixed on the retaining bowl, and a tensioning spring held in the cylinder to normally urge the taper plug downwardly to normally engage a plug hole diverging upwardly and formed in the cylindrical bush of the stationary disk for stationarily locking the cylindrical bush and the stationary disk without retaining bowl and an axle frame, whereby upon acting a pre-set overload driving force upon the eccentric wheel, the rotating disk, and the stationary disk, the taper plug will be thrusted upwardly by the plug hole of the cylindrical bush to uncouple the stationary disk with the retaining bowl for safety purpose.

11. A speed-variating means according to claim 10, wherein said taper lug has a tapering angle and the tensioning spring has an elastic force for normally frictionally and resiliently engaging the taper plug with the cylindrical bush, under a safe pre-set working load acting thereon.

12. A speed-variating means according to claim 10, wherein a plurally of coupling plugs are provided for rotatably coupling the cylindrical bush of the stationary disk with the retaining bowl each said coupling plug engageable with a plug groove annularly recessed in an outer periphery of the cylindrical bush.

* * * * *